US007599197B2

United States Patent
Ishii et al.

(10) Patent No.: US 7,599,197 B2
(45) Date of Patent: Oct. 6, 2009

(54) POWER SUPPLY APPARATUS

(75) Inventors: Hideo Ishii, Osaka (JP); Tetsuro Ikeda, Osaka (JP); Kenzo Danjo, Osaka (JP)

(73) Assignee: Sansha Electric Manufacturing Company, Limited, Osaka-shi, Osaka-fu (JP)

( * ) Notice: Subject to any disclaimer, the term of this patent is extended or adjusted under 35 U.S.C. 154(b) by 351 days.

(21) Appl. No.: 11/706,462

(22) Filed: Feb. 13, 2007

(65) Prior Publication Data
US 2007/0194724 A1 Aug. 23, 2007

(30) Foreign Application Priority Data
Feb. 21, 2006 (JP) .............................. 2006-043914

(51) Int. Cl.
*H02M 3/00* (2006.01)
(52) U.S. Cl. ...................................................... 363/15
(58) Field of Classification Search .............. 363/15, 363/16, 17
See application file for complete search history.

(56) References Cited

U.S. PATENT DOCUMENTS

| 4,472,672 | A | * | 9/1984 | Pacholok | 320/145 |
| 4,816,982 | A | * | 3/1989 | Severinsky | 363/44 |
| 4,943,902 | A | * | 7/1990 | Severinsky | 363/80 |
| 4,974,141 | A | * | 11/1990 | Severinsky et al. | 363/81 |
| 6,600,670 | B2 | * | 7/2003 | Morita et al. | 363/89 |

FOREIGN PATENT DOCUMENTS

JP 05-111244 4/1993

* cited by examiner

*Primary Examiner*—Adolf Berhane
*Assistant Examiner*—Yemane Mehari
(74) *Attorney, Agent, or Firm*—Duane Morris LLP

(57) ABSTRACT

A rectifying circuit (18) converts inputted AC power to DC power. An inverter circuit (22) converts the DC power to high-frequency power in accordance with a switching control signal applied thereto from a control circuit (50). A voltage transformer (24) voltage-transforms the voltage of the high-frequency power. An output-side rectifying circuit (40) rectifies the voltage-transformed power. An output detecting circuit (34) detects the magnitude of the voltage of the rectified power, and a signal representative of the detected voltage is applied to the control circuit (50). The control circuit (50) generates such a switching control signal as to make the rectified power have a predetermined value. The value of the voltage from the rectifying circuit (18) is detected by an input detecting circuit (62), and a signal representative of the detected voltage is applied to the control circuit (50). The control circuit (50) controls the operation of the inverter circuit (22) in accordance with the detected voltage representative signal from the input detecting circuit (62) and the saturation magnetic characteristic of the voltage-transformer (24).

6 Claims, 4 Drawing Sheets

POWER SUPPLY APPARATUS

This invention relates to a power supply apparatus for arc-utilizing apparatuses such as an arc welder and an arc cutter.

BACKGROUND OF THE INVENTION

An example of such power supply apparatuses is disclosed in JP 05-111244 A. The power supply apparatus disclosed in this Japanese publication includes a rectifier which rectifies a commercial AC power supply voltage, and the resultant rectified voltage is applied to a smoothing capacitor through a reactor. A voltage-boosting switching device is connected in the input of the smoothing capacitor. The charging time of the smoothing capacitor is controlled by controlling the ON and OFF times of the switching device. Thus, even when a commercial supply voltage of a different magnitude is applied to the apparatus, the input voltage to the smoothing capacitor can be made substantially constant through the appropriate control of the ON and OFF times of the voltage-boosting switching device. Accordingly, this power supply apparatus can be used with commercial power supply voltages of different magnitudes.

The smoothed voltage from the smoothing capacitor is applied to a high-frequency switching circuit, where it is converted to a high-frequency AC voltage, and the resultant high-frequency voltage is voltage-transformed by an output transformer. The voltage-transformed high-frequency voltage is, then, converted to a DC voltage, and the resultant DC voltage is applied, as it is or after it is re-converted to an AC voltage, to an arc load.

The above-described type of power supply apparatus is used in various countries and areas. In some places, commercial AC power supply voltages may be unstable because of, for example, unstable power supply ability. If the commercial AC power supply voltage applied to the power supply apparatus increases much, an excessive voltage is applied to the output transformer, causing its core to be saturated. Then, appropriate power can no longer be supplied to the load. In order to avoid such problem, a transformer with a magnetic saturation characteristic having some margin has been employed. However, the use of such output transformer having an unnecessary margin increases the size and weight of the power supply apparatus with such transformer. In addition, such power supply apparatus becomes expensive.

An object of this invention is to provide a power supply apparatus including an output transformer having suppressed magnetic saturation, which is smaller in size, lighter in weight and lower in cost than prior art apparatuses.

SUMMARY OF THE INVENTION

A power supply apparatus according to the present invention is supplied with AC power from a commercial power supply. The supplied AC power is converted to DC power by converting means, and the resulting DC power is then converted to high-frequency power through the switching operation of switching means. The voltage of the high-frequency power is voltage-transformed by a transformer. The voltage-transformed high-frequency power is rectified by rectifying means, whereby output power is provided. The output power may optionally be converted to AC power. The value of the output power, or the value of the voltage of the output power, or the value of the current of the output power is detected by first detecting means, which develops a first detection signal representative of the result of the detection. The first detection signal is supplied to control means. The control means provides a switching control signal for so controlling the switching operation of the switching means that the power value, voltage value or current value of the output power can be maintained constant. In this manner, feedback control can be realized to maintain the value of voltage, current or power of the output power constant.

If, for example, the magnitude of the voltage of the input commercial AC power abruptly changes; in particular, if the AC supply voltage increases extremely, the magnitude of the DC power resulting from the conversion in the converting means increases, and the magnitude of the voltage applied to the input of the transformer increases. If such situation continues, the core of the transformer is saturated, resulting in a standstill of the feedback control. In order to avoid it, according to the present invention, second detecting means is provided for detecting the voltage value of the DC power resulting from the conversion in the converting means. In other words, the value of the voltage applied to the input of the transformer is indirectly detected by the second detecting means. The second detecting means develops a second detection signal representative of the result of detection. The control means controls the switching operation of the switching means in accordance with the second detection signal and the saturation magnetic characteristic of the transformer. For example, the control means may control the switching operation of the switching means in accordance with the second detection signal in such a manner that the VT product, which is the product of the value of the voltage as applied to the input of the transformer with the time during which the voltage is applied to the transformer, can assume such a constant value as not to cause the saturation of the core of the transformer. In this manner, even when the commercial supply voltage changes extremely, magnetic saturation of the transformer can be avoided, and satisfactory feedback control can be realized.

The second detecting means may detect the value of the voltage of the AC power supplied by the commercial power supply, instead of the value of the DC voltage from the converting means.

The power supply apparatus according to the present invention may be so arranged that, when the switching means is ON, current can flow from the switching means to the transformer, and the control means can control the period during which the switching means is ON, in accordance with the second detection signal.

The switching control signal may be a signal for causing the switching means to perform switching operation based on the pulse width modulation (PWM) technique. The control means may control the width of the switching control signal during which the switching means is ON, in accordance with the second detection signal.

The control means may include error signal generating means, which generates an error signal representative of the difference between the first detection signal and a predetermined reference signal. In this case, a triangular waveform generating means is used, which generates a triangular waveform signal. PWM comparing means compares the triangular waveform signal with a threshold value which is the larger one of the second detection signal and the error signal. When the triangular waveform signal is equal to or larger than the threshold value, a PWM control signal is generated to turn on the switching means.

DESCRIPTION OF EMBODIMENTS OF THE INVENTION

Figure 1:
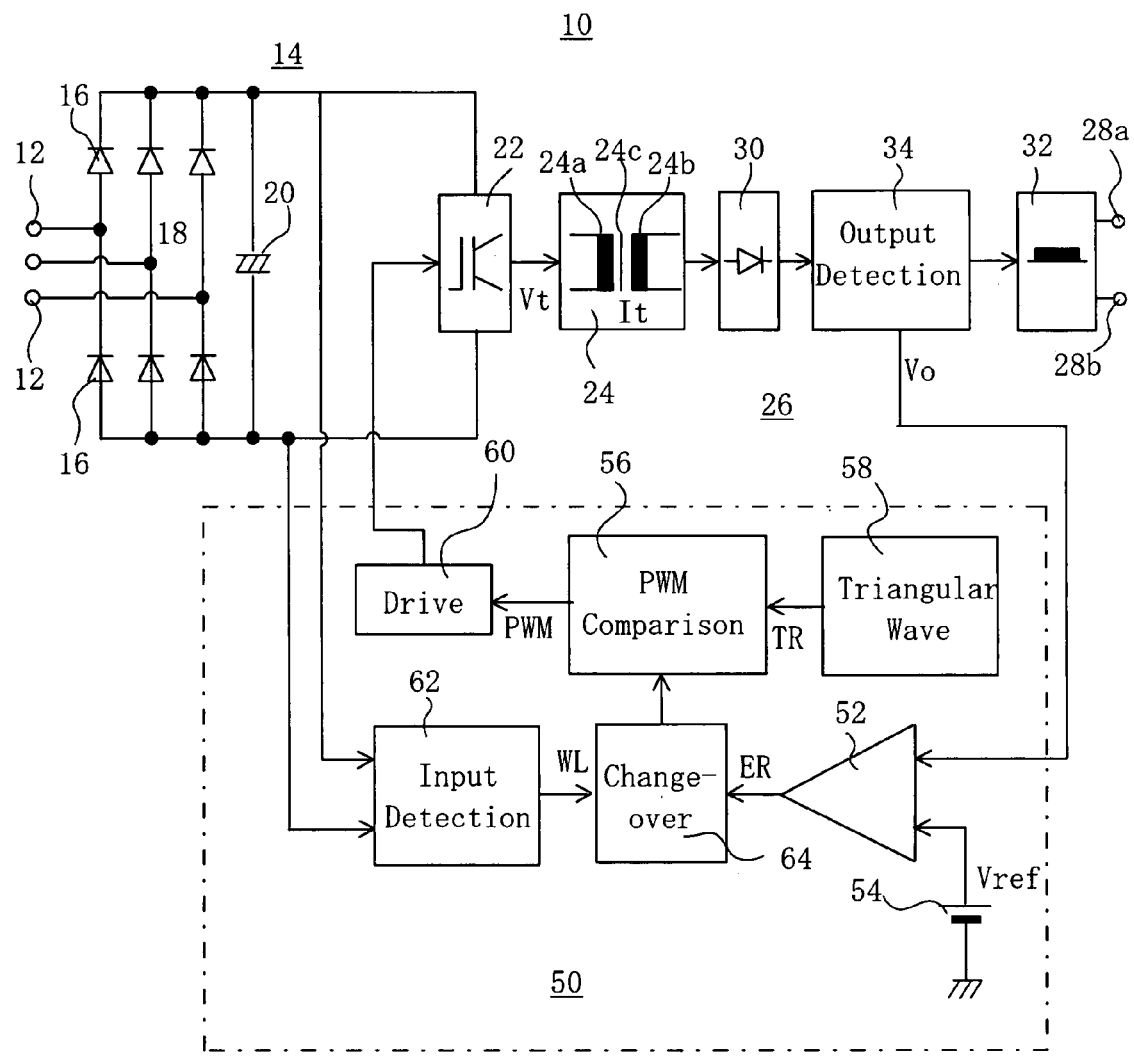
FIG. 1 is a block circuit diagram of a power supply apparatus according to one embodiment of the present invention.

A power supply apparatus 10 according to the present invention is shown in FIG. 1. The power supply apparatus 10 may be of a portable type. The power supply apparatus 10 has three input terminals 12 through which three-phase AC power is supplied to the apparatus 10 from a commercial power supply. The AC power supplied through the input terminals 12 is coupled to converting means, e.g. an input-side rectifying and smoothing circuit 14, where it is converted to DC power. The input-side rectifying and smoothing circuit 14 includes a three-phase bridge rectifying circuit 18 formed of, for example, six diodes 16, and also a smoothing capacitor 20 for smoothing the output of the three-phase bridge rectifying circuit 18.

The DC power from the input-side rectifying and smoothing circuit 14 is applied to switching means, e.g. an inverter circuit 22, where it is converted to high-frequency power at a frequency of from, for example, 10 kHz to 100 kHz. The inverter circuit 22 is formed by a plurality of semiconductor switching devices, for example, four IGBTs, bipolar transistors or FETs. The semiconductor switching devices are switched in response to four drive signals supplied from a drive circuit 60 in control means, e.g. a control circuit 50. In FIG. 1, for simplification of illustration, lines for supplying the four drive signals from the drive circuit 60 are represented by one line.

The high-frequency power developed by the inverter circuit 22 is applied to a primary winding 24a of an output transformer 24, which also has a secondary winding 24b. A voltage resulting from voltage-transforming the voltage Vt of the high-frequency power applied across the primary winding 24a is developed across the secondary winding 24b. The primary and secondary windings 24a and 24b of the output transformer 24 are wound on a core 24c.

The voltage-transformed high-frequency power is applied to an output-side rectifying and smoothing circuit 26, where it is converted to DC power. The resultant DC power is supplied, as the output power of the power supply apparatus 10, to an arc load (not shown), e.g. a torch and a workpiece, through output terminals 28a and 28b. The output-side rectifying and smoothing circuit 26 is formed by, for example, output-side rectifying means, e.g. a full-wave rectifying circuit 30, and output-side smoothing means, e.g. a smoothing reactor 32.

The voltage value of the output power, for example the value of the output voltage of the full-wave rectifying circuit 30 is detected by first detecting means, e.g. an output detecting circuit 34. A first detection signal, e.g. an output voltage representative signal Vo, which represents the value of the output voltage of the full-wave rectifying circuit 30, developed by the output detecting circuit 34 is applied to error amplifying means, e.g. an error amplifying circuit 52, of the control circuit 50.

The error amplifying circuit 52 receives also a DC reference signal Vref having a predetermined value applied thereto from a reference signal generating circuit 54, in addition to the output voltage representative signal Vo, and develops an error signal ER representative of the difference between the output voltage representative signal Vo and the reference signal Vref. The error signal ER is coupled through later-mentioned limiting means, e.g. a changeover circuit 64, to a PWM comparing circuit 56. For the explanation purpose, it is assumed that the error signal ER is inputted to the PWM comparing circuit 56 all the time.

The PWM comparing circuit 56 is supplied with a triangular waveform, e.g. a sawtooth waveform signal TR, at a frequency of from 10 kHz to 100 kHz, from a triangular waveform generating circuit 58. The PWM comparing circuit 56 generates a PWM control signal, for example a PWM signal based on the error signal ER and the triangular waveform signal TR. The PWM signal is used for PWM controlling the inverter circuit 22 in such a manner as to make the difference between the output voltage representative signal Vo and the reference signal Vref become zero. The PWM signal is applied to the drive circuit 60, where it is converted to the four drive signals for application to the inverter circuit 22. Thus, constant-voltage feedback control for maintaining the voltage value of the output power to be supplied to the arc load constant. By virtue of such feedback control, the power supply apparatus can provide a constant output voltage from a variety of commercial power supply voltage values. The power supply apparatus 10 of the illustrated example is arranged to operate from a commercial power supply voltage in a range of from 200 V to 400 V.

Let it be assumed that, for some reason, e.g. power supply or demand situation, in the area where the power supply apparatus 10 is used, the commercial power supply voltage changes abruptly. In particular, when the power supply voltage extremely increases, the value of the voltage applied to the inverter circuit 22 increases, causing the voltage Vt inputted to the output transformer 24 to increase. This, in turn, causes the core 24c of the transformer 24 to saturate, so that the feedback control cannot be maintained.

In order to prevent the feedback control from being brought to a standstill, the power supply apparatus 10 according to this embodiment is devised as described below.

Specifically, an input detecting circuit 62 is provided for the control circuit 50, which detects the input voltage to the inverter circuit 22. The input detecting circuit 62 generates a pulse width limiting signal WL, which assumes a voltage level according to the input voltage to the inverter circuit 22. The input detecting circuit 62 may be realized by, for example, a voltage dividing circuit formed by resistors. The pulse width limiting signal WL generated by the input detecting circuit 62 is coupled to the changeover circuit 64, which is supplied also with the error signal ER from the error amplifying circuit 52. The changeover circuit 64 couples the error signal ER to the PWM comparing circuit 56 when the error signal ER is equal to or larger than the pulse width limiting signal WL, and couples the pulse width limiting signal WL to the PWM comparing circuit 56 when the error signal ER is smaller than the pulse width limiting signal WL.

When generating the PWM control signal, the PWM comparing circuit 56 refers, not only to the error signal ER and the triangular waveform signal TR, but also to the pulse width limiting signal WL from the input detecting circuit 62. This operation is described in detail with reference to FIGS. 2A through 2D.

For example, when the commercial power supply voltage assumes a normal value, as shown in the leftward region in FIGS. 2A through 2D, expressed as "Normal Power Supply Voltage". In this region, as shown in the leftward region in FIG. 2A, the voltage level of the pulse width limiting signal WL is lower than that of the error signal ER, so that the changeover circuit 64 couples the voltage level of the error signal ER to the PWM comparing circuit 56, and the PWM signal is developed, as shown in the leftward region in FIG. 2B, when the voltage level of the triangular waveform signal TR is equal to or higher than the voltage level of the error signal ER. This causes the four drive signals to be generated, which, in turn causes each semiconductor switching device of the inverter circuit 22 to be turned on only during a time period corresponding to the width of the drive signal associated therewith, which, in turn, corresponds to the width of the PWM signal. Only during the time period when the semiconductor switching device is ON, the voltage Vt is applied to the output transformer 24 from the inverter circuit 22 as shown in the leftward region in FIG. 2C, and the current It flows through the transformer 24 as shown in the leftward region of FIG. 2D.

Figure 2:
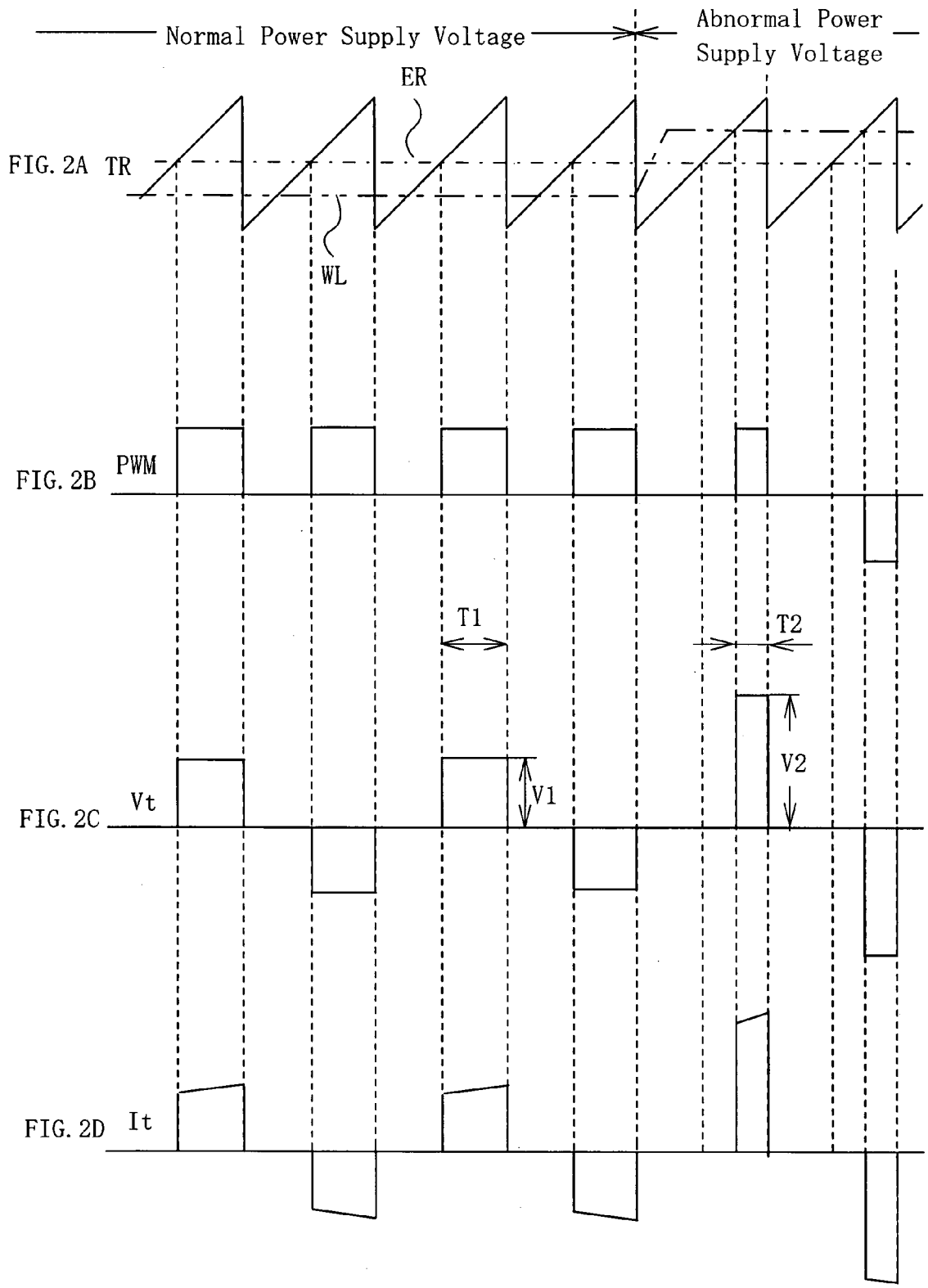
FIGS. 2A through 2D are various waveforms for use in explaining the operation of the power supply apparatus shown in FIG. 1.

If the commercial power supply voltage increases extremely, as indicated in the rightward region in FIGS. 2A through 2D, as expressed as "Abnormal Power Supply Voltage", so that the voltage level of the pulse width limiting signal WL increases extremely to exceed the voltage level of the error signal ER, the changeover circuit 64 couples the pulse width limiting signal WL, in place of the error signal ER, as the threshold value, to the PWM comparing circuit 56. When the voltage level of the triangular waveform signal TR is equal to or larger than the pulse width limiting signal WL, the PWM comparing signal 56 provides the PWM signal. This causes the pulse width of each drive signal decreases from T1, which is the width when the commercial power supply voltage is normal, to T2, as is seen in FIG. 2C, and the time period during which the voltage Vt is applied to the output transformer 24 decreases, accordingly, as is seen in the rightward region of FIG. 2C. While the large increase of the commercial power supply voltage causes the input voltage Vt to the output transformer 24 increases from, for example, V1, the magnitude when the power supply voltage is normal, to V2, as shown in the rightward region of FIG. 2C, the time period during which the voltage Vt inputted to the output transformer 24 decreases from T1 to T2. Also, although the current It flowing in the output transformer 24 increases, the time period during which the current It flows is limited, as is seen from the rightward region in FIG. 2D.

As described above, the PWM comparing circuit 56 adopts the higher one of the voltage levels of the error and pulse width limiting signals ER and WL as the threshold value, and uses this threshold value and the triangular waveform signal TR in generating the PWM signal. Whether the error signal ER or the pulse width limiting signal WL is selected as the threshold value, the product, VT, of the time period (pulse width) of one pulse of the PWM signal and the voltage Vt inputted to the output transformer 24 is made constant. That is, $T1 \times V1 = T2 \times V2 =$ constant. The error signal ER and the pulse width limiting signal WL are set in such a manner as to provide the constant VT product.

Figure 3:
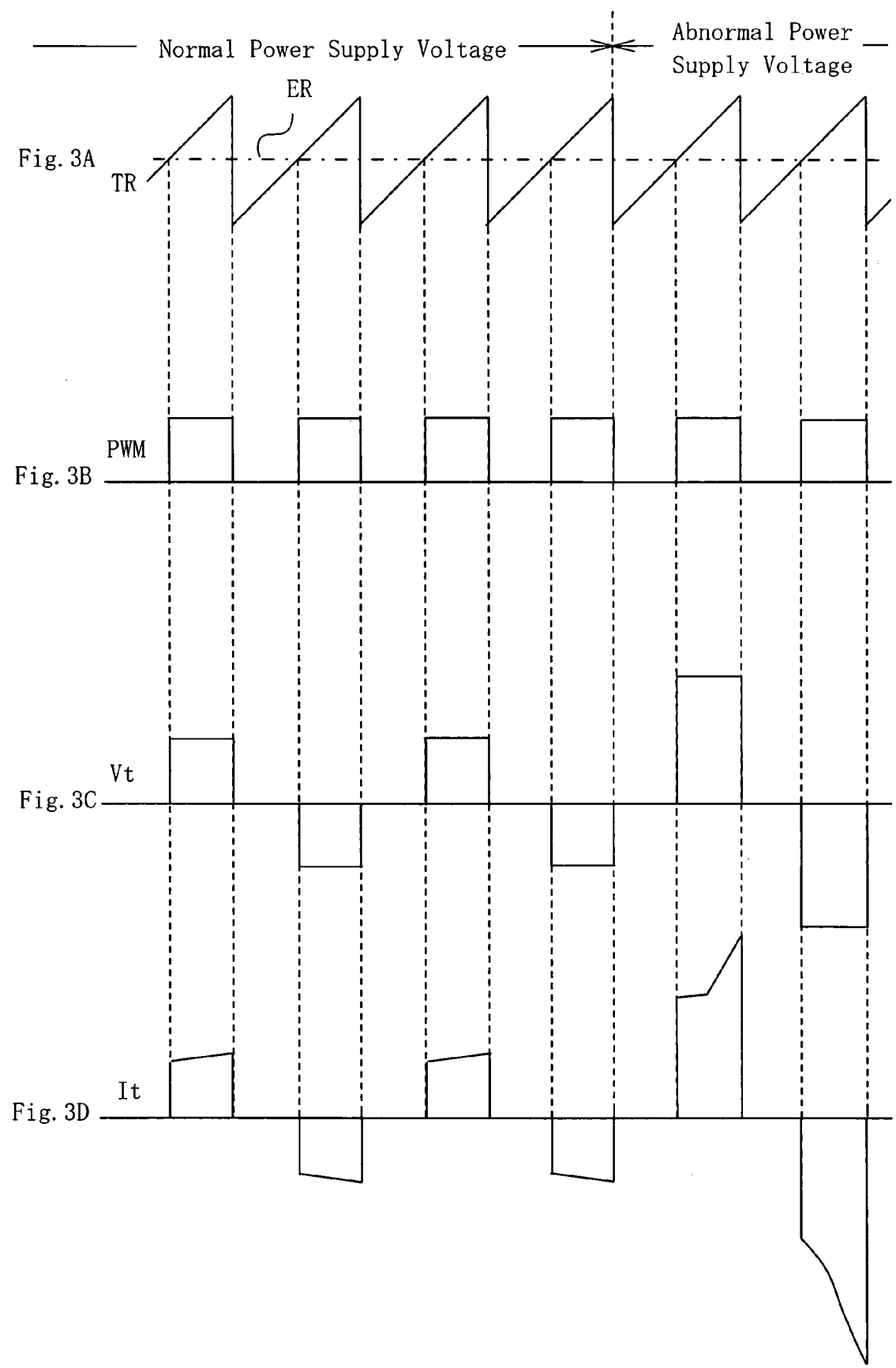
FIGS. 3A through 3D are waveforms, corresponding to the ones shown in FIGS. 2A through 2D, respectively, developed at various points in a power supply apparatus corresponding to the one shown in FIG. 1 but not including an input detecting circuit.

If the input detecting circuit 62 were not present, so that the PWM comparing circuit 56 did not refer to the pulse width limiting signal WL when producing the PWM signal, the following problem would be caused, as shown in FIGS. 3A through 3D. In this case, even if the commercial power supply voltage increases much, the pulse width of the drive signals would not be limited, as is seen from FIG. 3B. Then, as shown in FIG. 3C, the output transformer 24 would be supplied with the input voltage Vt, as shown in FIG. 3C, which assumes a magnitude of V2 for the time period of T1 corresponding to the pulse width of the drive signals. As a result, the VT product would exceed the value which is dependent on the saturation magnetic characteristic of the output transformer 24, so that the output transformer 24 would be magnetically saturated. This would cause the current It flowing through the transformer 24 to increase extremely. If this situation continued, the output transformer 24 would be damaged.

As described, the power supply apparatus 10 according to this embodiment is arranged such that, even when the commercial power supply voltage varies extremely, the pulse width of the PWM signal is restricted in such a manner that the VT product can be constant at a value not exceeding the value for the magnetic saturation characteristic of the output transformer 24. Accordingly, in comparison with the aforementioned prior power supply apparatus, which employs an output transformer having an unnecessarily large margin, the power supply apparatus 10 according to this embodiment can use a compact, light-weighted and inexpensive transformer as the output transformer 24. Thus, according to the present invention, the power supply apparatus 10 including the output transformer 24 can be smaller in size and weight and less expensive than prior apparatuses, and, still the magnetic saturation of the output transformer 24 can be prevented. As is understood from the above description, the arrangement of the power supply apparatus 10 is particularly suitable for portable power supply apparatuses.

Figure 4:
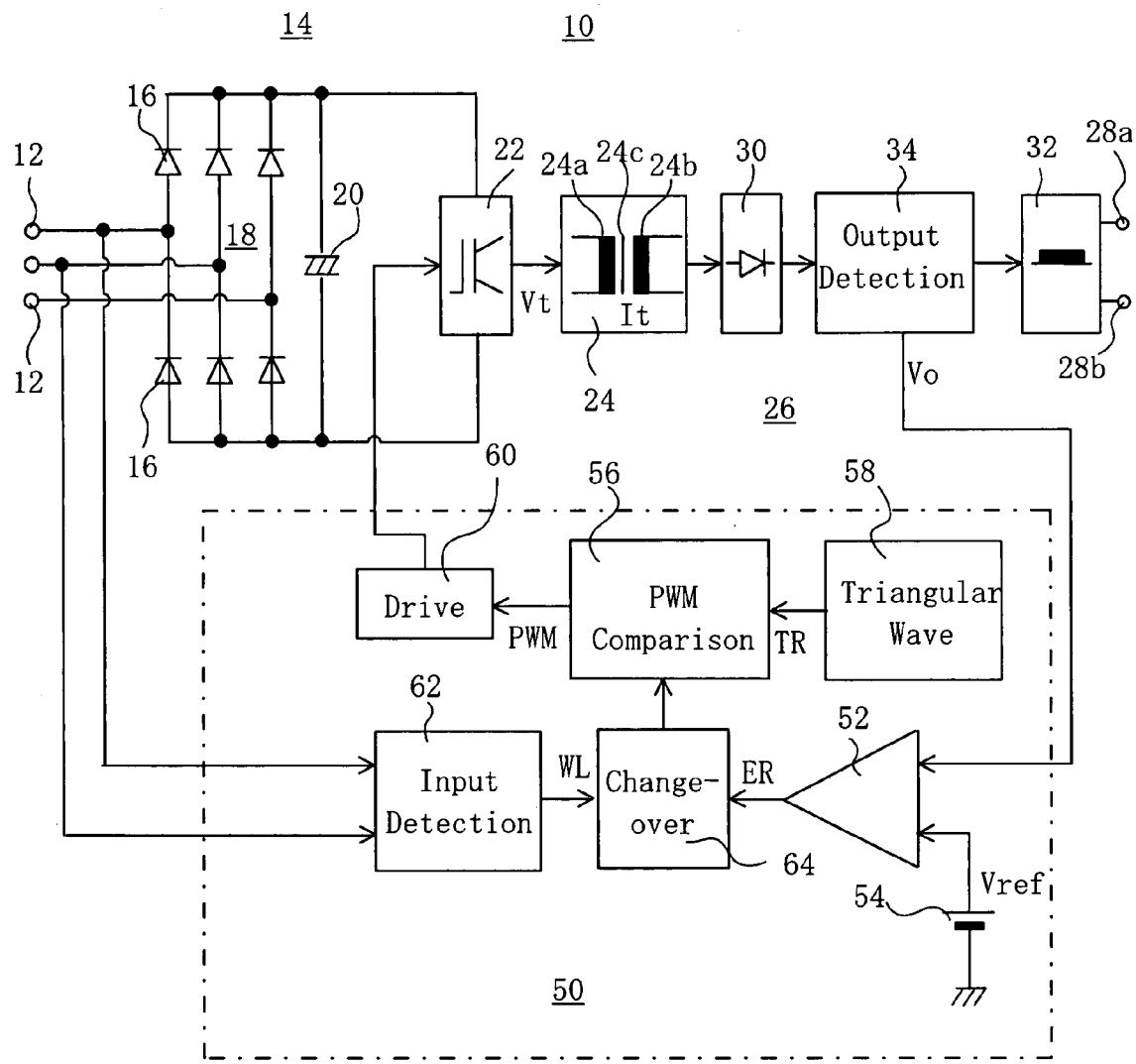
FIG. 4 is a block circuit diagram according to another embodiment of the present invention.

According to the above-described embodiment, the input detecting circuit 62 is used to detect the input voltage to the inverter circuit 22, and the pulse width of the PWM control signal is limited based on the result of detection made by the input detecting circuit 62. As an alternative, a detecting circuit 70 may be used, as shown in FIG. 4, to detect the commercial power supply voltage appearing between two of the input terminals 12, and the pulse width of the PWM control signal may be limited in accordance with the result of detection by the detecting circuit 70. The detecting circuit 70 may be formed by a voltage-transforming circuit for lowering the commercial power supply voltage appearing between two of the input terminals 12, for example, and a converting circuit for converting the voltage-transformed AC voltage from the voltage-transforming circuit to a DC voltage.

According to the above-described embodiment, the output detecting circuit 34 is used and detects the voltage value of the output power, but, instead, constant current control may be employed, instead, by detecting the current value of the output power, or, alternatively, constant power control may be employed by detecting the power value (e.g. the product of the voltage value with the current value) of the output power.

For an arc load operating from AC output power, another converting circuit may be additionally used to convert the DC power from the output-side rectifying and smoothing circuit 26 to AC power.

Further, in order to avoid influence of various types of noise, a filter circuit may be connected in the outputs of the output detecting circuit 34 and the input detecting circuit 62 (or 70) to thereby remove such noise.

The present invention has been described by embodiments in which the inverter circuit 22 is PWM controlled, but any other suitable control technique, e.g. the PAM (Pulse Amplitude Modulation) control technique may be used with the present invention.

Further, although the present invention has been described as being embodied in a power supply apparatus for an arc welder, the present invention can be embodied in power supply apparatuses for other arc loads such as an arc cutter, and can be embodied also in power supply apparatuses for electroplating, for example, other than arcing.

What is claimed is:

1. A power supply apparatus comprising:
    converting means for converting input AC power to DC power;
    switching means receiving said DC power and performing switching operation in accordance with a switching control signal, for converting said DC power to high-frequency power;
    a voltage transformer for transforming a voltage of said high-frequency power;
    rectifying means for rectifying the power as voltage-transformed by said voltage transformer;
    first detecting means for detecting a magnitude of said rectified power, a voltage of said rectified power, or a current of said rectified power and developing a first detection signal representative of the detected magnitude of power, voltage or current;
    error signal generating means for generating an error signal representative of the difference between said first detection signal and a predetermined reference signal;
    second detecting means for detecting a voltage value of said DC power and developing a second detection signal representative of the detected voltage value;
    triangular waveform generating means for generating a triangular waveform signal; and
    PWM comparing means for comparing said triangular waveform signal with a threshold value, which is a larger one of said second detection signal and said error signal, and generating a PWM control signal for making said switching means ON when said triangular waveform signal is equal to or larger than said threshold value.

2. The power supply apparatus according to claim 1, wherein the value of said second detection signal increases as the voltage of said AC power increases.

3. The power supply apparatus according to claim 1, wherein said PWM comparing means is supplied with said threshold value from a switching circuit, said switching circuit supplies said error signal as said threshold value to said PWM comparing means when said error signal is equal to or larger than said second detection signal, and supplies said second detection signal as said threshold value to said PWM comparing means when said error signal is smaller than said second detection signal.

4. A power supply apparatus comprising:
    converting means for converting input AC power to DC power;
    switching means receiving said DC power and performing switching operation in accordance with a switching control signal, for converting said DC power to high-frequency power;
    a voltage transformer for transforming a voltage of said high-frequency power;
    rectifying means for rectifying the power as voltage-transformed by said voltage transformer;
    first detecting means for detecting a magnitude of one of said rectified power, a voltage of said rectified power, and a current of said rectified power, and developing a first detection signal representative of the detected magnitude;
    error signal generating means for generating an error signal representative of the difference between said first detection signal and a predetermined reference signal;
    second detecting means for detecting a voltage value of said AC power and developing a second detection signal representative of the detected voltage value;
    triangular waveform generating means for generating a triangular waveform signal; and
    PWM comparing means for comparing said triangular waveform signal with a threshold value, which is a larger one of said second detection signal and said error signal, and generating a PWM control signal for making said switching means ON when said triangular waveform signal is equal to or larger than said threshold value.

5. The power supply apparatus according to claim 4, wherein the value of said second detection signal increases as the voltage of said AC power increases.

6. The power supply apparatus according to claim 4, wherein said PWM comparing means is supplied with said threshold value from a switching circuit, said switching circuit supplies said error signal as said threshold value to said PWM comparing means when said error signal is equal to or larger than said second detection signal, and supplies said second detection signal as said threshold value to said PWM comparing means when said error signal is smaller than said second detection signal.

* * * * *